(12) United States Patent
Breau et al.

(10) Patent No.: US 7,769,035 B1
(45) Date of Patent: Aug. 3, 2010

(54) FACILITATING A CHANNEL CHANGE BETWEEN MULTIPLE MULTIMEDIA DATA STREAMS

(75) Inventors: Jeremy R. Breau, Kansas City, MO (US); Frederick C. Rogers, Olathe, KS (US); Lyle T. Bertz, Lee's Summit, MO (US); William Rout, Olathe, KS (US); Amirali Emami, Vienna, VA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 11/777,741

(22) Filed: Jul. 13, 2007

(51) Int. Cl.
*H04L 12/28* (2006.01)
(52) U.S. Cl. ........................ 370/412; 370/392
(58) Field of Classification Search ........................ None
See application file for complete search history.

(56) References Cited

U.S. PATENT DOCUMENTS

| | | | | |
|---|---|---|---|---|
| 6,101,170 | A * | 8/2000 | Doherty et al. | 370/255 |
| 6,487,198 | B1 * | 11/2002 | Pierson, Jr. | 370/356 |
| 6,832,295 | B1 * | 12/2004 | Stonecypher | 711/135 |
| 6,996,117 | B2 * | 2/2006 | Lee et al. | 370/429 |
| 7,551,636 | B2 * | 6/2009 | Morrison | 370/412 |
| 2003/0210684 | A1 * | 11/2003 | Lai et al. | 370/381 |
| 2006/0026293 | A1 * | 2/2006 | Virdi et al. | 709/231 |
| 2007/0183415 | A1 * | 8/2007 | Fischer et al. | 370/389 |
| 2008/0059724 | A1 * | 3/2008 | Stifter | 711/154 |

* cited by examiner

*Primary Examiner*—Phirin Sam
(74) *Attorney, Agent, or Firm*—Shook, Hardy & Bacon L.L.P.

(57) ABSTRACT

Techniques are provided for facilitating a channel change between multiple data streams. Such techniques provide for receiving and processing a first stream of data packets within a buffer. The method also includes receiving buffer control header with a data packet of a second stream. The buffer control header includes a buffer clearance indicator that indicates whether the second data stream request for the first data stream to be cleared from the buffer. Moreover, the method includes clearing the first data stream from the buffer based on the buffer clearance indicator. Furthermore, the method includes immediately processing the second stream through the buffer once the first stream is cleared.

16 Claims, 9 Drawing Sheets

BUFFER CLEARANCE INDICATOR – 2 BITS
0 – CLEAR BUFFER NOW/CHECK SECURITY
1 – LET BUFFER PLAY OUT
2 – CLEAR BUFFER ONCE MBS IS REACHED
3 – RESERVED FOR FUTURE USE

CLEARABILITY INDICATOR – 2 BITS
0 – CLEARABLE
1 – CANNOT CLEAR/CHECK SECURITY
2 – EMERGENCY SERVICES
3 – RESERVED FOR FUTURE USE

US 7,769,035 B1

FACILITATING A CHANNEL CHANGE BETWEEN MULTIPLE MULTIMEDIA DATA STREAMS

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, facilitating a channel change between multiple data streams.

In a first aspect, a set of computer-readable media provide a method that includes receiving a first stream of data packets and processing a set of packets of the first stream within a buffer. The method also includes receiving a first data packet from a second stream of data packets related to multimedia content. The first data packet may be a key frame with a buffer control header, and the buffer control header can include a buffer clearance indicator. Moreover, the method includes managing the set of data packets of the first data stream based on the buffer clearance indicator. Furthermore, the method includes processing the second stream through the buffer to provide the related multimedia content to a user.

In a second aspect, a buffer control header provides a buffer clearance indicator for indicating if an incoming data stream wants a buffer to be cleared of previous data packets. Additionally, the buffer control header provides a clearability indicator for indicating if a second data stream can cause the incoming data stream to be cleared from the buffer.

In a third aspect, another set of computer-readable media provides a method that includes appending a buffer control header to a data packet of a data stream. The method further includes inputting a buffer clearance indicator and a clearability indicator into the buffer control header. Moreover, the method includes transmitting the buffer control header with the clearance indicator and a clearability indicator to a client device.

In a fourth aspect, a computing device, with a processor coupled to a memory, has a buffer control header for facilitating a channel change between multiple data streams. The computing device processes an incoming data stream that has the buffer control header appended to each frame. The computing device identifies a buffer clearance indicator located in the buffer control header. The buffer control header indicates if the incoming data stream wants a buffer to be cleared of previous data packets. The computing device identifies a clearability indicator located in the buffer control header. The clearability indicator indicates if a second data stream can cause the incoming data stream to be cleared from the buffer.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media which includes computer-storage media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, RAM, ROM, EEPROM, flash memory or other memory technology, CD-ROM, digital versatile discs (DVD), magnetic cassettes, magnetic tape, magnetic disk storage, and other magnetic storage devices. These technologies can store data momentarily, temporarily, or permanently.

Figure 1:
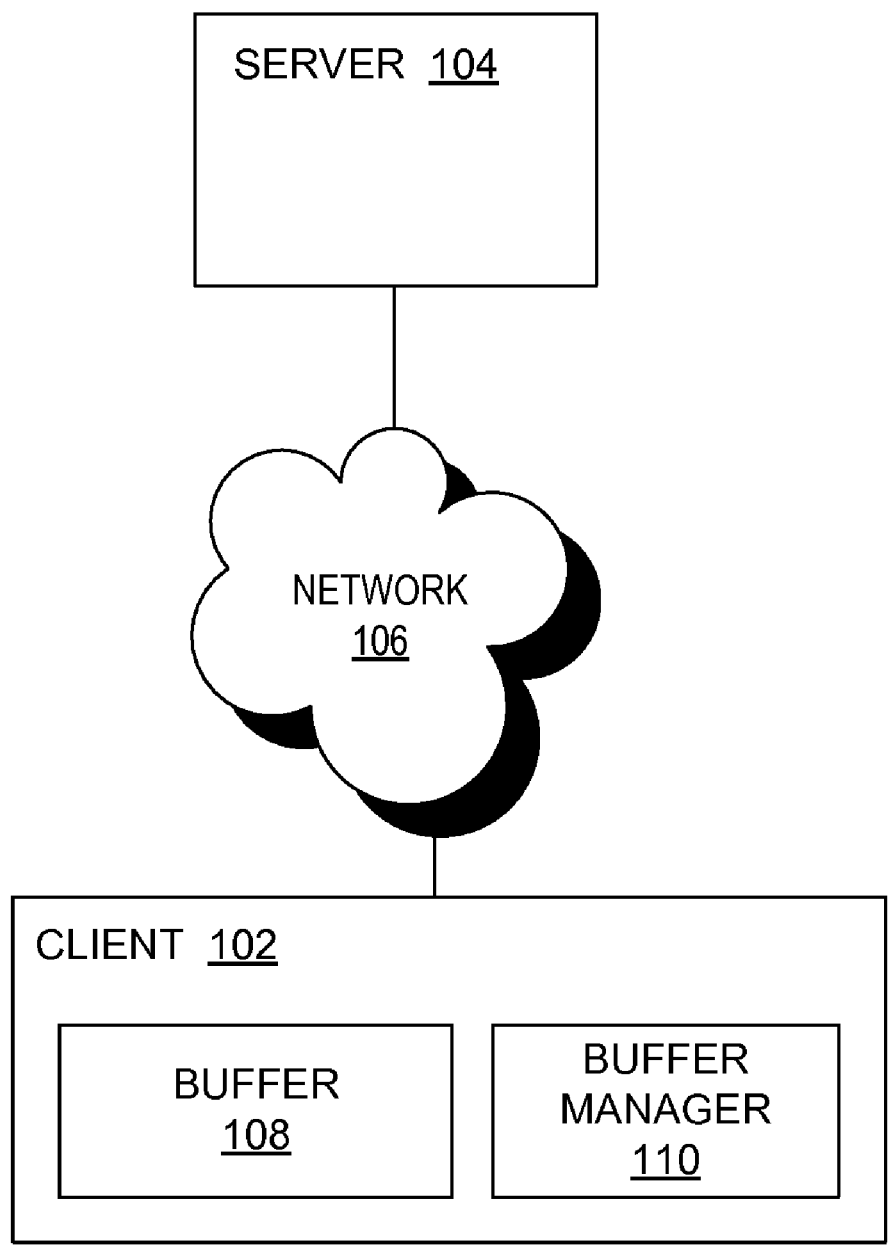
FIG. 1 is a block diagram of an embodiment of an exemplary system for implementing the invention.

FIG. 1 is a block diagram of an embodiment of an exemplary system 100 for implementing the invention. The system 100 includes client 102, content provider 104, and network 106. Client 102 and content provider each include a communication interface. The communication interface may be an interface that can allow the client 102 and content provider 104 to be directly connected to each other or allows the client 102 and content provider 104 to be connected to each other over network 106. Network 106 can include, for example, a local area network (LAN), a wide area network (WAN), or the Internet. In an embodiment, the client 102 and content provider 104 can be connected to each other via a wireless communication interface through the network 212.

Content provider 104 may be or can include a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™ Apache™, OpenStep™ or other operating system or platform. Content provider 104 is configured to provide a plurality of different types of multimedia content, including video, audio, and text data, to one or more client devices 102. In an embodiment, content provider 104 can provide real-time streaming delivery of multimedia content over Internet Protocol (IP) via network 106. In an embodiment, content provider 104 may be a television program provider that provides television programming to client 102. In another embodiment, content provider 104 may be a Voice-over IP (VoIP) provider for facilitating phone calls between two or more clients 102.

Client 102 may be or can include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. Client 102 includes buffer 108 and buffer manager 110. Buffer 108 is configured to receive data packets of a multimedia stream from a content provider 104, temporarily store the multimedia data packets, and process the multimedia data packets within client 102. Once processed through the buffer, the data within the data packets are provided to a user of client 102. Buffer manager 110 is a computer software or hardware component configured to manage the processing of data packets within buffer 108. Buffer manager 110 is configured to rearrange data packets within the buffer 108 based on a sequence order, clear data packets from the buffer 108 when necessary, and determine a priority level between multiple data packets.

Figure 2:
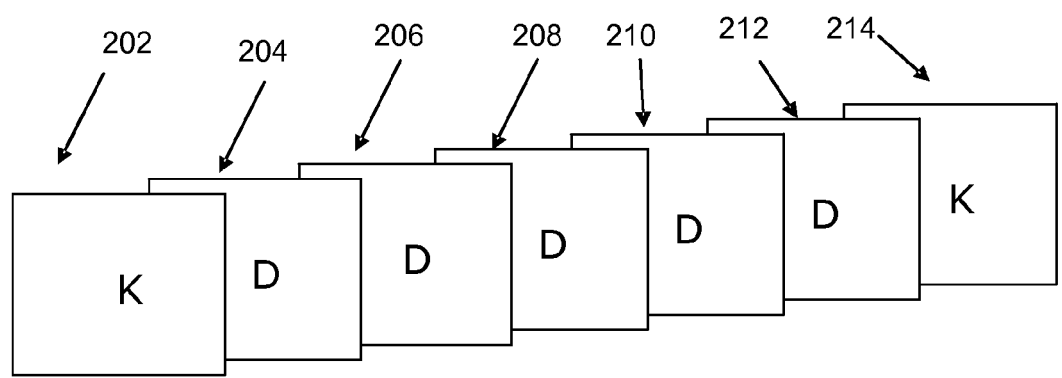
FIG. 2 is a block diagram of an exemplary stream of multimedia data packets according to an embodiment of the invention.

FIG. 2 is a block diagram of an exemplary stream of multimedia data packets 200 according to an embodiment of the invention. The stream 200 may be, for example, a stream of video content. In FIG. 2, the first data packet 202 includes a key frame. Generally, the initial packet of a video stream is referred to as a key frame which is also known as a random access point. A key frame represents a full and complete image that is displayed on a display screen of a client device 102. Typically, an algorithm is used to calculate the differences between the key frame 202 and the next frame to be displayed in the video content. Instead of sending the full, complete frame of the next frame, only the differences between the key frame 202 and the next frame are sent as a dependent frame 204. Dependent frames 206, 208, 210, and 212 are subsequently sent and contain a frame of video content that represents the differences between the frame before it and the next frame that is to be displayed.

Dependent frames are generally smaller in size than key frames. The smaller size is one reason why dependent frames are sent more often, about 90% or more, than key frames. The smaller size saves bandwidth for a multimedia stream and reduces processing times. It takes, on average, 6 to 36 dependent frames to complete a full image for standard encoders. Moreover, a key frame may be sent only once or twice within an entire video stream. For example, referring to FIG. 2, if the video stream 200 (not including key frame 214) is of a television show, a first key frame 202 may be sent to start the playback of the beginning of the show. Five to eight minutes later, a second key frame 214 may be sent to start the playback of a commercial, for example, followed by a series of dependent frames of the video content for the commercial. A third key frame (not shown) may be sent after the end of the commercial to begin the playback of the rest of the television show, for example, followed by a series of dependent frames comprising the rest of the segment of the show.

The distribution of key frames and dependent frames is an important aspect when it comes to the slowness of channel changing in streaming multimedia data to client devices 102. A channel change occurs when a user takes action to switch from one multimedia stream to another. Some examples of channel changes are: switching from one television channel to another, switching from one radio channel to another, and switching from one caller to another on a VoIP call when a call waiting service is in use. A major issue that contributes the slowness of channel changing today is that a user may begin to receive only dependent frames when the user transitions into the new multimedia stream as dependent frames are sent by content providers the majority of the time. As mentioned previously, a dependent frame does not include a full, complete frame to be provided to a user. As such, multimedia content is initially provided to the user only in part. For example, certain sections of an image may be missing when displayed to a user or the picture may appear coarse or "grainy". As such, it may take several seconds for a client device to receive enough dependent frames to reconstruct an item of video or audio content for example to be provided in an acceptable form to a user. Such a delay is often detrimental to the user's experience.

One solution would be to configure the content provider to send additional key frames of a new multimedia stream to a client device when it detects that a user is switching to the new multimedia stream. With the additional key frames, the client device could provide the multimedia content quicker since it will not have to take time reconstructing the content from dependent frames. However, a small or limited bandwidth environment may not be able to efficiently handle the large size of the key frames. Sending as many dependent frames as possible may be the best way for such an environment to optimally operate. Such a solution would assume little loss of data in the environment and the frames can be sent quickly to facilitate fast channel change. This, however, may not work in environments where the media is generated and then directly distributed as in, for example, live broadcast television or an interactive voice conversation.

Figure 3:
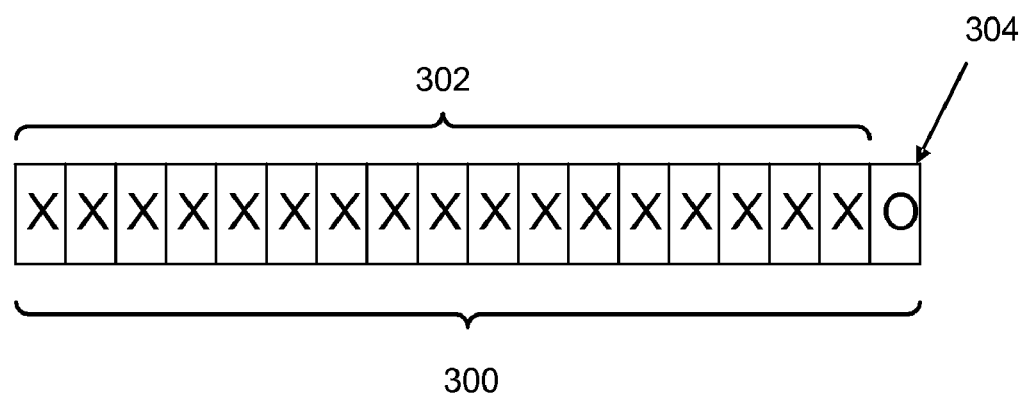
FIG. 3 is a block diagram that illustrates an example of how a larger-sized buffer may actually add to the slowness of a channel change.

Another issue that adds to the slowness of channel changing is the size of the buffer 108 processing the data packets within a client 102. Generally, a client device would like to have a larger-sized buffer in order to process larger key frames and to store data packets that arrive out-of-sequence or ahead of their play time. However, a larger-sized buffer may actually add to the slowness of a channel change because the remaining data packets of the first data stream being provided to a user must be fully processed through the buffer before the new data packets of the new stream are processed. FIG. 3 helps illustrate this dilemma. FIG. 3 is a block diagram of an exemplary buffer 300 according to an embodiment of the invention. In FIG. 3, the portions of the buffer 300 with an "X" represent the remaining frames of a first multimedia stream 302 that is currently being processed by a client device. The portion of the buffer 300 with the "O" represents the first packet of the new multimedia stream. Although a user has taken action to begin experiencing the new multimedia stream, the user will still have to wait until the remaining packets 302 of the first stream are processed through the buffer. The wait time can be upwards to 15 seconds which too is often detrimental to the user's experience.

The invention introduces a buffer control header that helps reduce the time delay associated with a channel change between two data streams. The buffer control header allows a client device to maintain a larger-sized buffer for bandwidth purposes while allowing a buffer manager to clear the buffer of previous data packets when a new data stream, associated with a channel change, reaches the client. By clearing the buffer of the previous packets, the user will not have to wait for the previous packets to play-out before experiencing the content of the new data stream. Thus, the time it takes to transition from a previous data stream to a new data stream is shortened.

Figure 4:
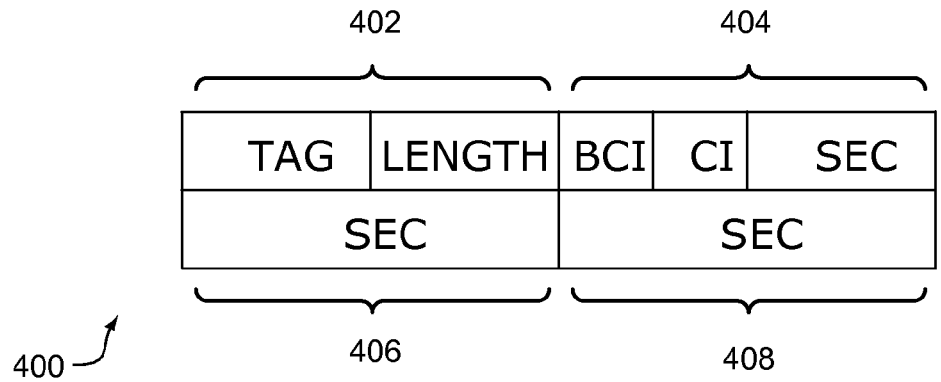
FIG. 4 is a block diagram of an exemplary buffer control header according to an embodiment of the invention.

FIG. 4 is a block diagram of an exemplary buffer control header 400 according to an embodiment of the invention. The buffer control header 400 is part of a key frame within a data stream and is applied to all dependent frames within the data stream. In an embodiment, the buffer control header 400 is appended to data packets of all frames within the stream including the dependent frames. The buffer control header 400 is analyzed by the buffer manager 110 (FIG. 1) and the buffer manager configures the buffer 108 (FIG. 1) according to the contents of the buffer control header 400.

The buffer control header comprises a tag identifier, a length identifier, a buffer control indicator (BCI), a clearabiltiy indicator (CI), and multiple security (SEC) identifiers. Each section of the buffer control header 400, including the tag/length section 402, the BCI/CI/SEC section 404, and the SEC sections 406 and 408, comprise one byte for a total of four bytes for the entire buffer control header 400. The tag identifier identifies that the header 400 is a buffer control header, and the length identifier details the length of the header. The BCI is utilized to inform a buffer manager if the new data stream coming to the client wishes for all previous data packets to be cleared from the buffer. In an embodiment, the BCI is 2 bits. In such an embodiment, a value of "0" is utilized to indicate to the buffer manager to clear any previous packets from the buffer immediately. The buffer manager, however, is configured to check the security level of the incoming packet to see if it has a higher priority level than the previous packets already in the buffer. In accomplishing this, the incoming data packet may also contain one or more identifiers that indicate the incoming data stream's priority level. One or more of the previous data packets within the buffer may also have one or more identifiers that indicate the priority level of previous data stream. If the incoming stream has a higher priority level than the previous stream, the previous stream is immediately cleared from the buffer. If the previous stream has a higher priority level than the incoming stream, then the incoming stream's request to clear the previous stream is denied.

A BCI value of "1" is utilized to indicate that the incoming stream will let the previous packets in the buffer play-out. A BCI value of "2" is used to indicate that the incoming data stream wishes for any previous packets to be cleared from the buffer once a minimum buffer sequence (MBS) has been reached for the incoming data stream. An MBS is a minimum number of packets of the incoming data stream that are present in the buffer. The MBS is used to help ensure that there are enough data packets to be able to provide a complete item of multimedia content to a user before the previous data stream is cleared. In an embodiment, the MBS is a predetermined value that is already set within the client. In another embodiment, the MBS may be included with a data packet of the incoming data stream. A BCI value of "3" is reserved for a future use.

The CI is used to indicate whether a subsequent data stream can clear a data stream that is currently being processed or that is about to be processed within the buffer. A buffer manager may view a current data stream's CI as part of its security check when determining whether to clear the current data stream based on an incoming data stream's BCI. In an embodiment, the CI comprises 2 bits. In such an embodiment, a CI value of "0" is used to indicate that a particular data stream is clearable. Accordingly, if an incoming data stream wishes to clear a data stream from a buffer that has a CI value of "0," the incoming data stream can do so without the buffer manager having to execute a security check of the priority levels of each stream.

A CI value of "1" is used to indicate that a particular data stream cannot be cleared unless the new incoming data stream has a higher priority level. Accordingly, a buffer manager must check the priority levels of both data streams and current data stream will be cleared from the buffer if the incoming data stream has a higher priority level. Again, the priority level of each data stream may be determined from priority identifying information that accompanies the data streams. A CI value of "2" is used to indicate that a particular data stream is associated with an emergency service and cannot be cleared until it is finished playing out of the buffer. In an embodiment, a CI value of "2" gives the data stream the highest possible priority level such that the data stream cannot be cleared by another data stream. In another embodiment, a security check may still be made by the buffer manager as there may be different priority levels for emergency services. Additionally, a CI value of "3" is reserved for future use. The SEC identifiers are used for authenticating the data packets. The SEC identifiers may be agreed upon based on other packets accompanying the buffer control header and/or by out-of-band mechanisms. In an embodiment, the MBS may be included in an SEC identifier.

Figure 5:
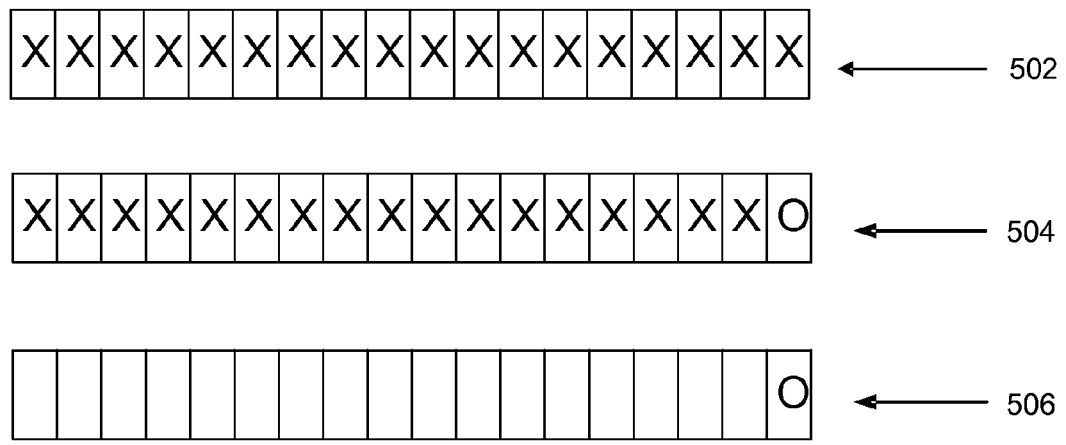
FIG. 5 illustrates an example of a use of a buffer control header according to an embodiment of the invention.

FIG. 5 illustrates an example of a use for a buffer control header according to an embodiment of the invention. Buffer arrangement 502 shows a first data stream being processed through a buffer, wherein each space of the buffer contains a data packet (represented by an "X") of the first data stream. Subsequently, a user may then choose to make a channel change and the first packet of the new data stream (represented by the "O"), as shown in buffer arrangement 504, is received. The new data packet includes a buffer control header that contains a BCI for clearing the buffer of previous data packets. Assuming that the current data stream (represented with the X's) is clearable (CI value of "0") or has a lower priority level than the new data stream and, if the MBS is not present or set to a value equivalent to 1 frame, the current data stream, as shown in buffer arrangement 506, is cleared from the buffer and the first data packet of the new data stream remains.

Figure 6:
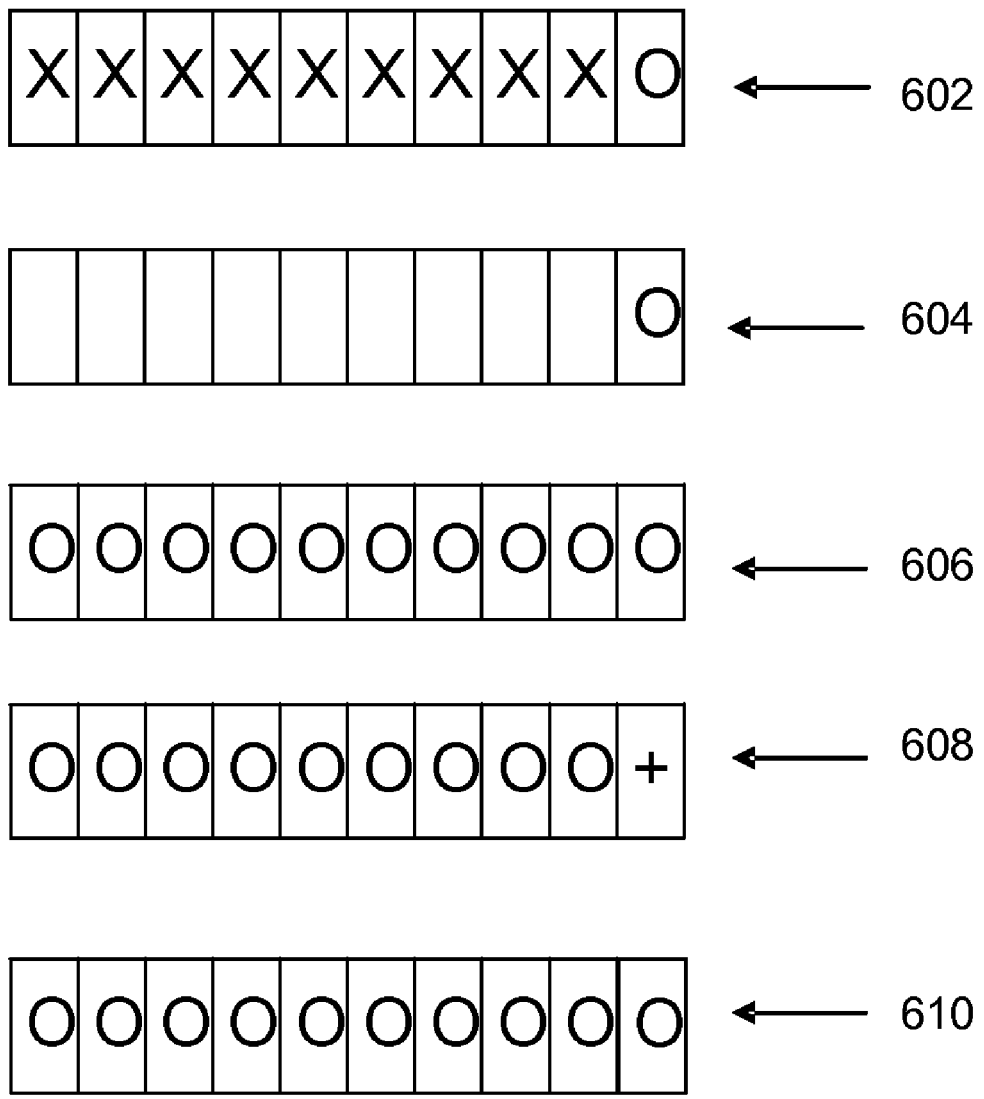
FIG. 6 illustrates another example of a use of a buffer control header according to an embodiment of the invention.

FIG. 6 illustrates another example of a use of a buffer control header according to an embodiment of the invention. Buffer arrangement 602 shows a first data stream (represented by the X's) being processed within a buffer and a new packet of a second data stream (represented by the "O") being received in the buffer. The new packet of the second data stream may be received due to a channel change. The new data packet includes a buffer control header that contains a BCI for clearing the buffer of previous data packets of the first data stream. Assuming that the first data stream (represented with the X's) is clearable (CI value of "0") or has a lower priority level than the second data stream, the first data stream, as shown in buffer arrangement 604, is cleared from the buffer and the first data packet of the second data stream remains. As time passes, more data packets of the second data stream are entered and processed within the buffer as shown in buffer arrangement 606. Buffer arrangement 608 shows a first data packet of a third data stream (represented by the "+") being received in the buffer. The new packet of the third data stream may be received due to a channel change. The new data packet includes a buffer control header that contains a BCI for clearing the buffer of the previous packets of the second data stream. However, as shown in buffer arrangement 610, the second data stream cannot be cleared as the buffer manager has determined that the second data stream is part of an emergency service or the second data stream has a higher priority level than the third data stream. Accordingly, the buffer manager refuses to clear the second data stream and drops the third data stream's packets.

Figure 7A:
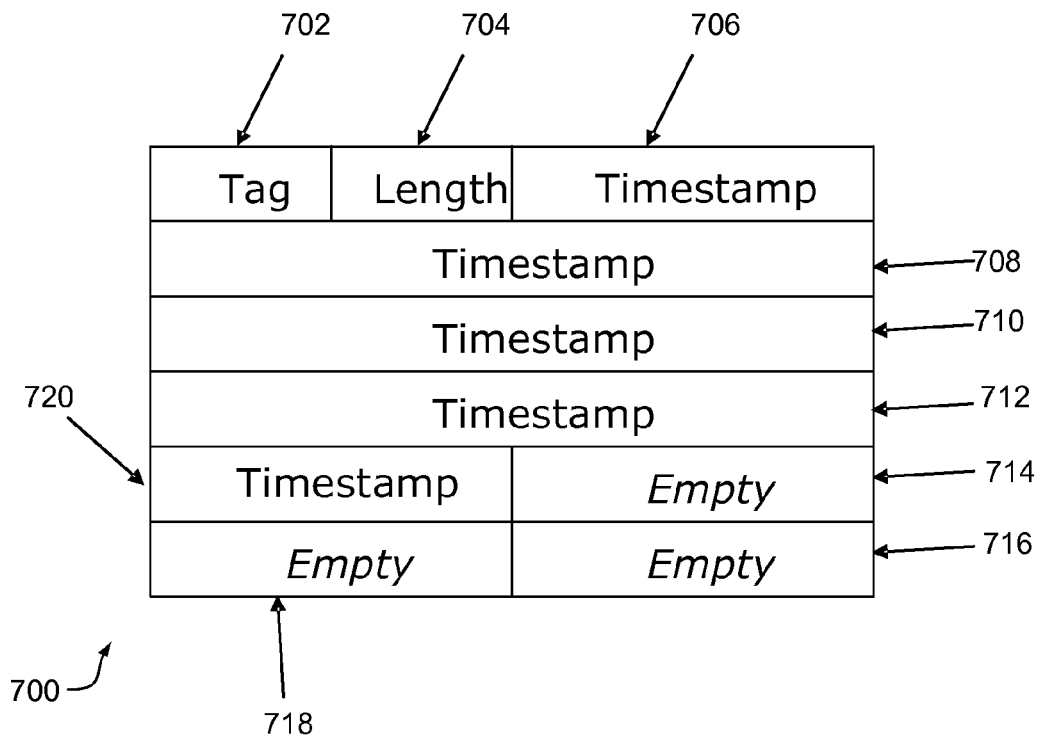
FIG. 7A is a block diagram of an exemplary Real Time Protocol (RTP) In Band Synchronization (Sync) header.

FIG. 7A is a block diagram of an exemplary Real Time Protocol (RTP) In Band Synchronization (Sync) header 700. The RTP In Band Sync header was suggested by the Internet Multimedia Streaming Alliance (IMSA) for solving the problem of timestamps, necessary in order to use a key frame from a new RTP stream, being delivered well-after the time the key frame reaches the buffer. As shown in FIG. 7A, the timestamp is now included along with the key frame within the RTP In Band Sync header 700. The tag identifier 702 indicates that the header is a RTP In Band Sync header, and the length identifier 704 indicates the length of the header. Timestamp sections 706, 708, 710, 712 and 720 comprise the timestamp for the data packet. Sections of 714, 716, and 718 are empty and are not used. The tag section 702 combined with the length section 704 comprises 1 byte as well as the timestamp sections 706 and 720 and each of the empty sections 714, 716, and 718. Timestamp sections 708, 710 and 712 each comprise 2 bytes, which gives the total size of the RTP In Band Sync header 700 as being 12 bytes. Since the empty sections 714, 716, and 718 are not being used, it would be beneficial to eliminate the wasted space from the RTP In Band Sync header 700 in order to save bandwidth space. However, a RTP standards compliant header extension can usually only be done in multiples of four so the RTP In Band Sync header 700 must keep the wasted space even if it is not being used.

Figure 7B:
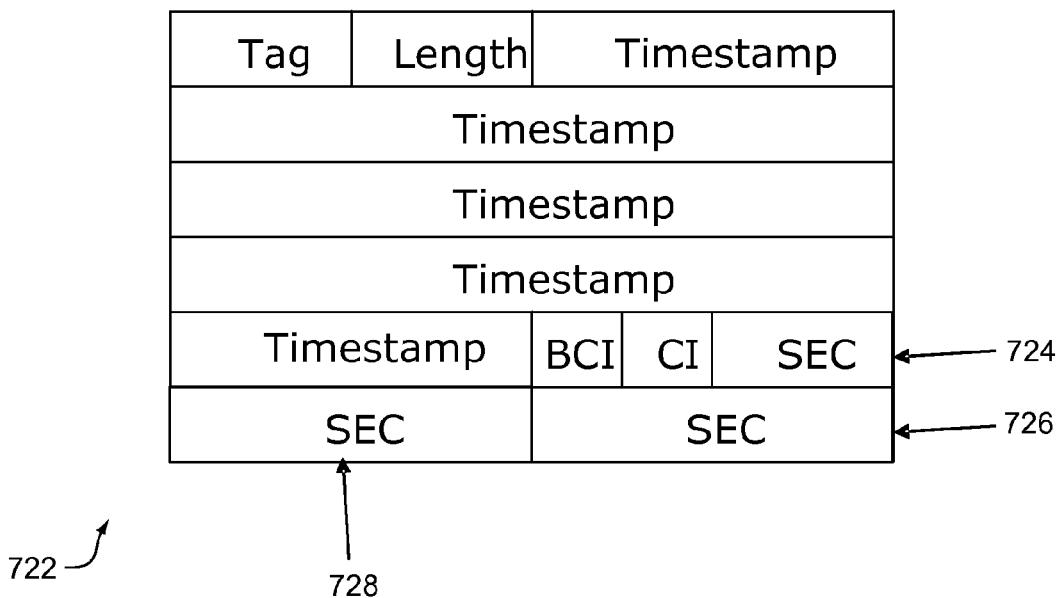
FIG. 7B is a block diagram of an exemplary RTP In Band Sync header that incorporates elements of a buffer control header according to an embodiment of the invention.

The invention further suggests incorporating the buffer control header into the empty spaces of the RTP In Band Sync header. FIG. 7B is a block diagram of an exemplary RTP In Band Sync header 722 that incorporates elements of a buffer control header according to an embodiment of the invention. As shown, the BCI/CI/SEC section 724 of the buffer control header replaces the empty section 714, and SEC sections 726 and 728 of the buffer control header replace empty sections 716 and 718 respectively. Each newly added section (724, 726 and 728) comprises 1 byte and maintains the 12 byte composition of the original RTP In Band Sync header 700.

Figure 8:
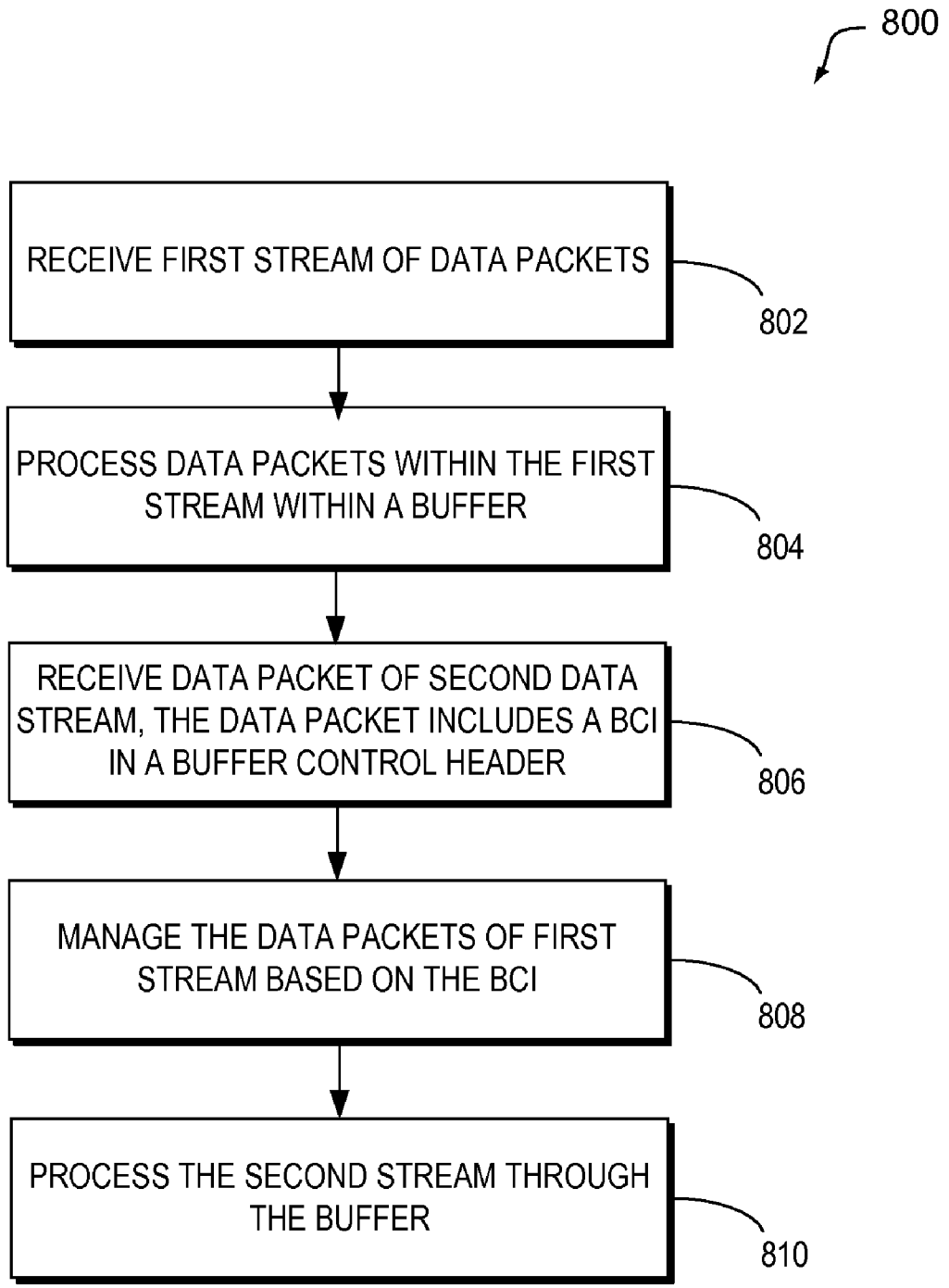
FIG. 8 is a flow diagram of an exemplary method of facilitating a channel change between multiple data streams according to an embodiment of the invention.

FIG. 8 is a flow diagram of an exemplary method 800 of facilitating a channel change between multiple data streams according to an embodiment of the invention. At operation 802, a first stream of data packets is received. In an embodiment, the first stream is received by a buffer manager 110 within a buffer 108. At operation 804, data packets within the first stream are processed within the buffer. At operation 806, a first data packet from a second stream of data packets is received, wherein the second stream is related to multimedia content. In an embodiment, the first data packet may be a key frame. Moreover, the first data packet of the second stream includes a buffer control header that contains a buffer clearance indicator. At operation 808, the data packets of the first stream are managed based on the buffer clearance indicator and, if the priorities are similar between the streams the priorities established by the SEC data. Managing may include clearing the data packets from the buffer or allowing the data packets to play-out within the buffer. At operation 810, the second stream is processed through the buffer in order to provide the related multimedia content to a user.

Figure 9:
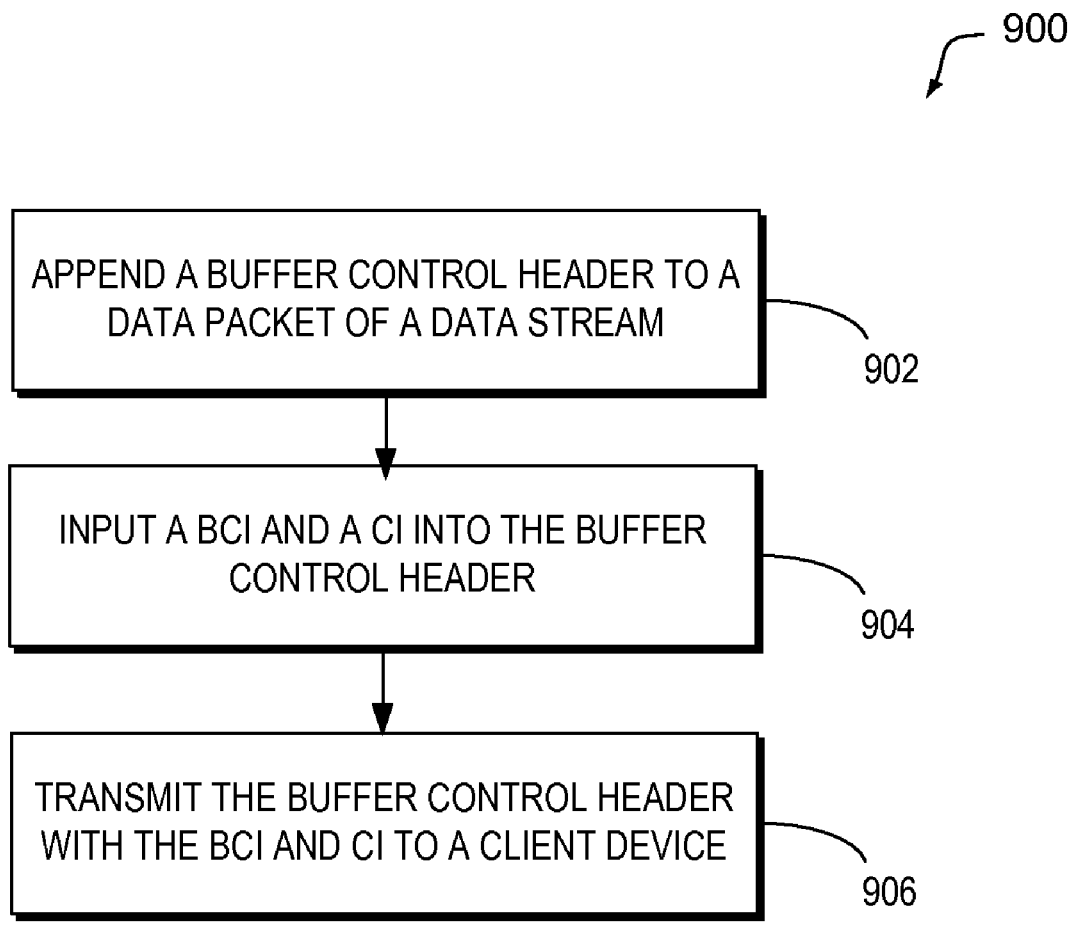
FIG. 9 is a flow diagram of another exemplary method of facilitating a channel change between multiple data streams according to an embodiment of the invention.

FIG. 9 is a flow diagram of another exemplary method 900 of facilitating a channel change between multiple data streams according to an embodiment of the invention. At operation 902, a buffer control header is appended to a first data packet of a data stream. At operation 904, a buffer clearance indicator and a clearability indicator are inputted into the buffer control header. At operation 906, the buffer control header, with the clearance indicator and a clearability indicator, is transmitted to a client device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions executable by a computing device for facilitating a channel change between multiple data streams, comprising:
   receiving a first stream of data packets;
   processing one or more data packets of the first stream within a buffer;
   receiving a first data packet from a second stream of data packets related to multimedia content, the first data packet being a key frame with a buffer control header, wherein the buffer control header includes a buffer clearance indicator;
   managing the one or more data packets based on the buffer clearance indicator; and
   processing the second stream through the buffer to provide the related multimedia content to a user,
   wherein managing the one or more data packets comprises continuing the processing of the one or more data packets until a minimum buffer size is reached for the second stream of data packets based on the clearance indicator.

2. The media according to claim 1, further comprising clearing the one or more data packets from the buffer when the minimum buffer size is reached.

3. One or more computer-readable media having computer-useable instructions executable by a computing device for facilitating a channel change between multiple data streams, comprising:

receiving a first stream of data packets;

processing one or more data packets of the first stream within a buffer;

receiving a first data packet from a second stream of data packets related to multimedia content, the first data packet being a key frame with a buffer control header, wherein the buffer control header includes a buffer clearance indicator;

managing the one or more data packets based on the buffer clearance indicator; and processing the second stream through the buffer to provide the related multimedia content to a user, wherein managing the one or more data packets is further based on a clearability indicator of the first stream, wherein managing the one or more data packets comprises comparing the buffer clearance indicator to the clearability indicator to determine whether to clear the one or more data packets from the buffer.

4. The media according to claim 3, further comprising clearing the one or more data packets from the buffer if the clearability indicator indicates that the first stream is clearable and the buffer clearance indicator indicates that the second stream wants the buffer to cleared.

5. The media according to claim 3, further comprising clearing the one or more data packets from the buffer if the second stream has a higher priority level than the first stream.

6. The media according to claim 3, further comprising continuing the processing of the one or more data packets if the first stream has a higher priority level than the second stream.

7. A computing device, with a processor coupled to a memory, having a buffer control header for facilitating a channel change between multiple data streams, comprising:

the computing device processes an incoming data stream that has the buffer control header appended to each frame;

the computing device identifies a buffer clearance indicator located in the buffer control header, the buffer control header indicates if the incoming data stream wants a buffer to be cleared of previous data packets; and the computing device identifies a clearability indicator located in the buffer control header, the clearability indicator indicates if a second data stream can cause the incoming data stream to be cleared from the buffer.

8. The computing device according to claim 7, wherein the buffer clearance indicator includes a value for indicating that the previous data packets are to be cleared from the buffer.

9. The computing device according to claim 7, wherein the buffer clearance indicator includes a value for indicating that the previous data packets are to be cleared from the buffer once a minimum buffer size is reached for the incoming data stream.

10. The computing device according to claim 7, wherein the clearability indicator includes a value for indicating that the second data stream can clear the incoming data stream from the buffer if the second data stream desires.

11. The computing device according to claim 7, wherein the clearability indicator includes a value for indicating that the second data stream can only clear the incoming data stream from the buffer if the second data stream has a higher priority level than the incoming data stream.

12. The computing device according to claim 7, wherein the buffer control header is included with an In band Synchronization Header.

13. The computing device according to claim 7, wherein a value for the minimum buffer size is included within a data packet of an incoming stream.

14. One or more tangible computer-readable media having computer-useable instructions executable by a computing device for facilitating a channel change between multiple data streams, comprising:

appending a buffer control header to at least one data packet of a data stream;

inputting a buffer clearance indicator and a clearability indicator into the buffer control header; and transmitting the buffer control header with the clearance indicator and a clearability indicator to a client device.

15. The media according to claim 14, wherein the at least one data packet includes a key frame.

16. The media according to claim 14, wherein the buffer control header is included with an In Band Synchronization header.

* * * * *

UNITED STATES PATENT AND TRADEMARK OFFICE
CERTIFICATE OF CORRECTION

| | |
|---|---|
| PATENT NO. | : 7,769,035 B1 |
| APPLICATION NO. | : 11/777741 |
| DATED | : August 3, 2010 |
| INVENTOR(S) | : Jeremy R. Breau et al. |

Page 1 of 1

It is certified that error appears in the above-identified patent and that said Letters Patent is hereby corrected as shown below:

Title page; item (73) Assignee should read as follows: Clear Wireless LLC, Kirkland, WA (US)

Signed and Sealed this

Sixteenth Day of November, 2010

David J. Kappos
*Director of the United States Patent and Trademark Office*